Dec. 3, 1968  J. A. SHOOK  3,413,933
LOCKING MECHANISM
Filed Oct. 3, 1966  3 Sheets-Sheet 1
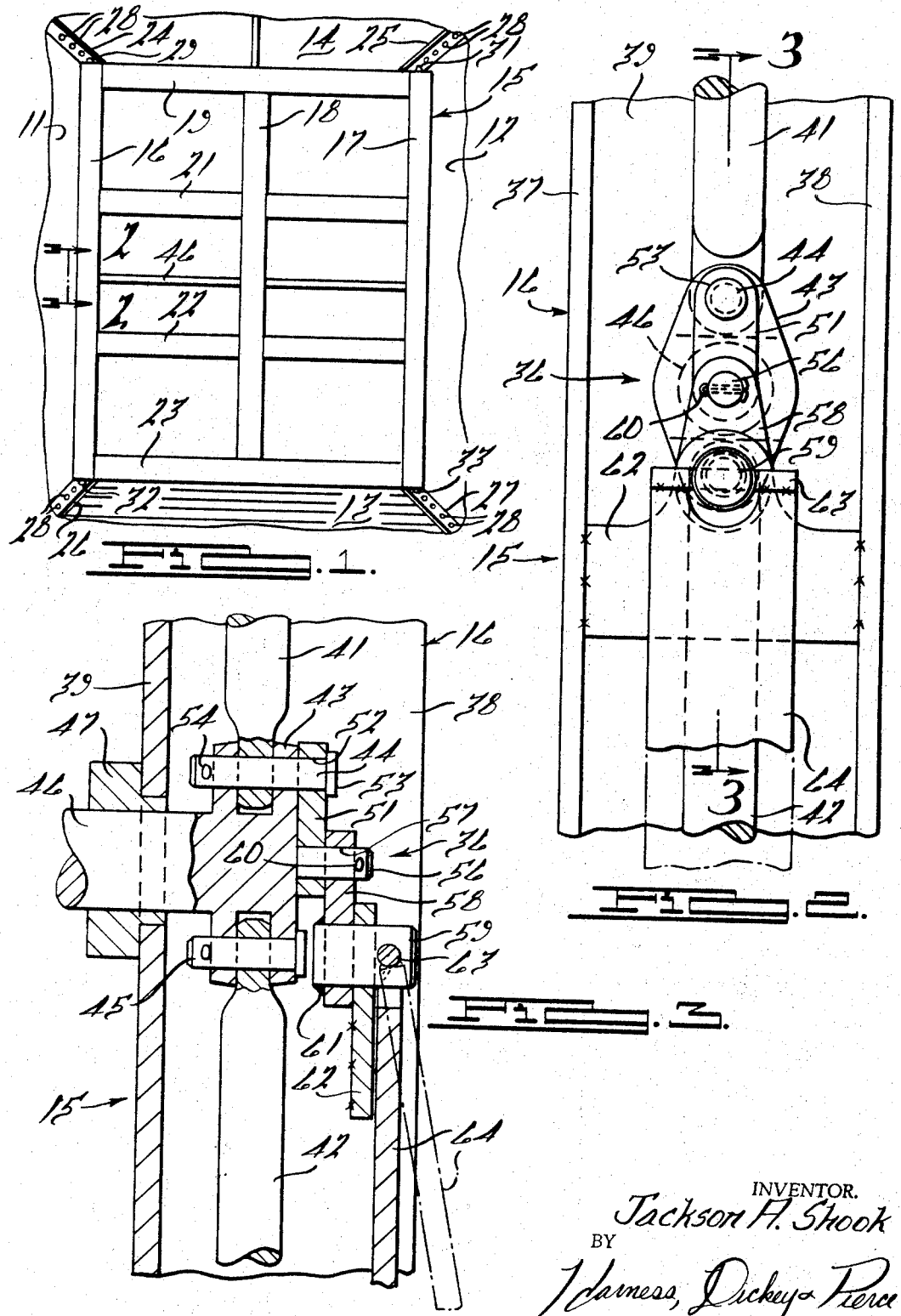
INVENTOR.
Jackson A. Shook
BY
Harness, Dickey & Pierce
ATTORNEYS

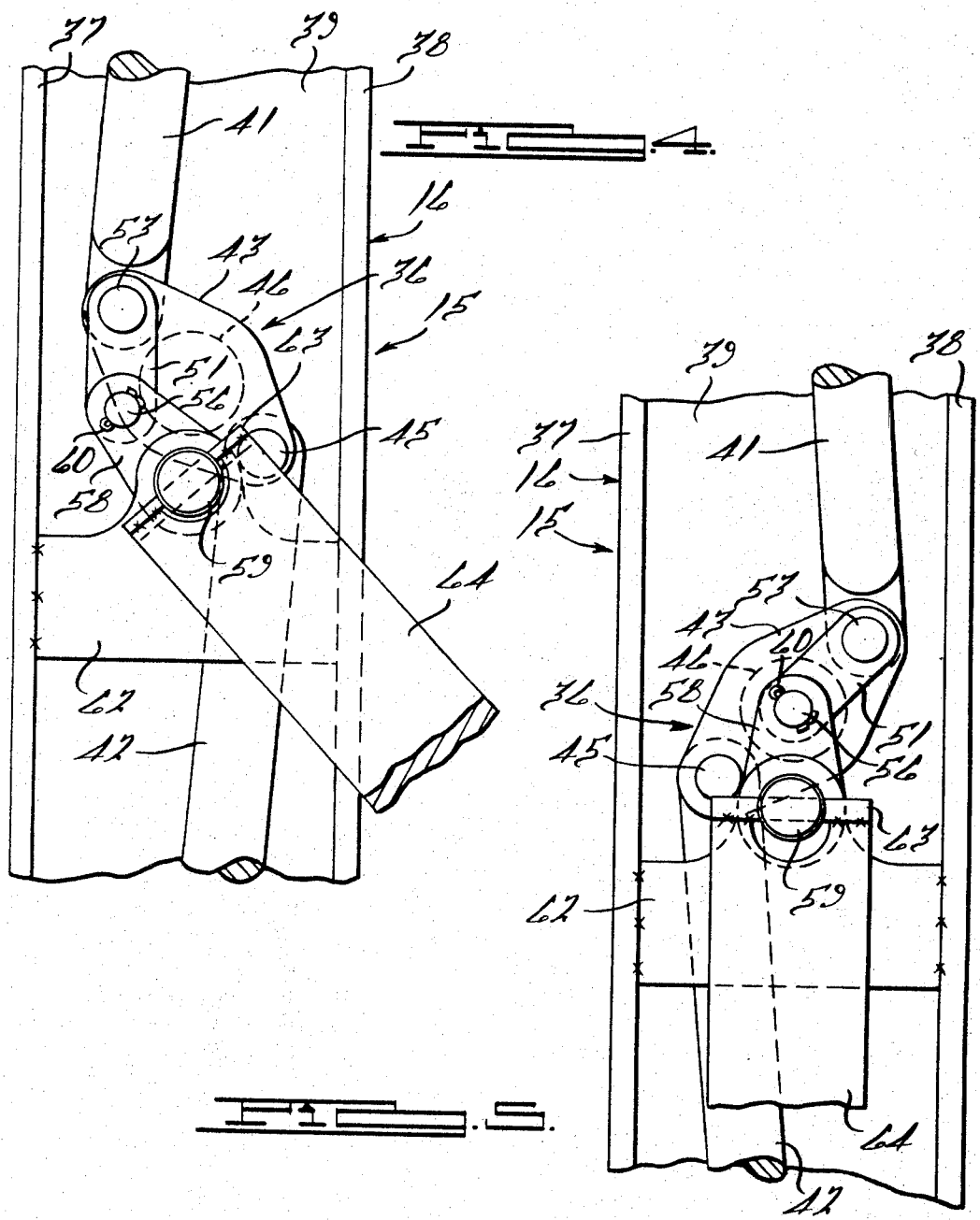

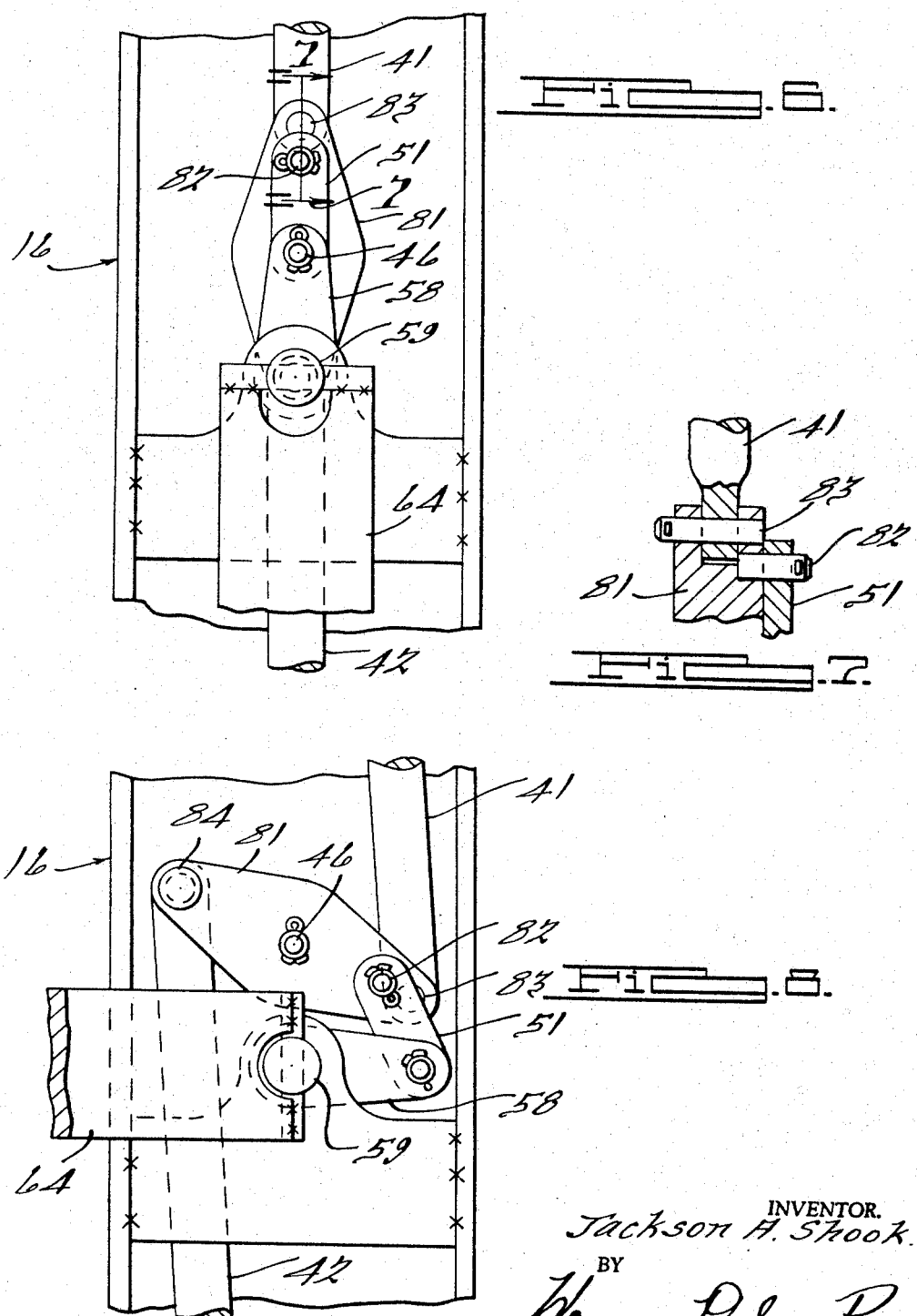

United States Patent Office 3,413,933
Patented Dec. 3, 1968

3,413,933
LOCKING MECHANISM
Jackson A. Shook, Northville, Mich., assignor to Evans Products Company, a corporation of Delaware
Filed Oct. 3, 1966, Ser. No. 583,878
11 Claims. (Cl. 105—376)

ABSTRACT OF THE DISCLOSURE

A cargo bracing system including a bulkhead assembly having operating handles for its locking mechanism at each side of the bulkhead frame. Each of the operating handle assemblies provides for operation of the locking pins upon movement of one of the operating handles without attendant movement of the other operating handle.

This invention relates to a locking mechanism for a freight bracing device and more particularly to an improved operating structure for the freight bracing locking mechanism.

One common form of device for bracing freight within a cargo area, particularly that of a vehicle such as a railway car, is a freight bracing bulkhead. Such bulkheads are supported in some manner for movement along the cargo area to any of a plurality of cargo bracing positions. A locking mechanism is provided for retaining the bulkhead in the selected bracing positions. In many instances it is desirable to provide a plurality of operating handles for actuating the locking mechanism at different locations with respect to the bulkhead. Preferably, some structure should be provided so that the operation of the locking mechanism by means of one of the operating handles does not result in movement of the other operating handles.

It is, therefore, a principal object of this invention to provide a locking mechanism for a freight bracing bulkhead or the like, wherein the locking mechanism operator is independently movable of the operating handle.

It is a further object of the invention to provide a locking mechanism having an improved connection between an operator and the lock that permits the lock to be operated independently of movement of the operator.

Various types of operative connections have been suggested for use between an operating handle and a bulkhead locking mechanism that will permit the locking mechanism to be moved independently of the operating handle. Normally the connection must be engaged and disengaged as a separate step in the operation. Preferably, however, the operative connection should be automatically engageable upon movement of the operating handle so that no other coupling step is required.

It is, therefore, another object of this invention to provide a locking mechanism wherein movement of an operating handle automatically results in operation of the locking device but wherein the locking device may be operated independently of movement of the operating handle.

It is a still further object of this invention to provide an improved connection of the aforenoted type.

An operating mechanism embodying this invention is particularly adapted for actuating the locking device of a freight bracing bulkhead or the like. The operating mechanism comprises an operating member operatively connected to the locking device and supported for movement in fixed path about a first center of movement for operating the locking device between its engaged and disengaged positions. An actuating member is operatively connected to the operating member. Means support the actuating member for movement about a second center of movement substantially coincident with the first center of movement for simultaneous movement of the operating and actuating members about the first and second centers. Means are operatively connected to the actuating member for displacing the actuating member from its aforenoted path of movement about the second center of movement. This displaced movement of the actuating member is transmitted into movement of the operating member about its first center of movement by the operative connection between the actuating member and the operating member.

The invention described in the preceding paragraph has particular application in combination with a freight bracing bulkhead assembly that retains freight within a cargo area. In this application, the freight bracing bulkhead includes locking means for retaining it in selected freight bracing positions relative to the cargo area. An operating member is supported upon the bulkhead assembly for pivotal movement about a first pivot axis. Means operatively connect the operating member to the locking means for moving the locking means between its engaged and disengaged positions upon pivotal movement of the operating member about the first pivot axis. A first link has a first pivotal connection to the operating member at a point spaced from the first pivot axis. An actuating member is supported for movement between first and second positions upon the bulkhead assembly. A second pivotal connection is provided between the actuating member and the first link. The pivot axis of the second pivotal connection is substantially coincident with the first pivot axis when the actuating member is in its first position for simultaneous pivotal movement of the first link and the operating member about the first pivot axis when the actuating member remains stationary in its first position. An operating handle is operatively connected to the actuating member for displacing the actuating member from its first to its second position and for displacing the first link to pivot the operating member about the first pivot axis and operate the locking means.

Other objects and advantages of this invention will become more apparent as this description proceeds, particularly when considered in conjunction with the accompanying drawings, wherein:

FIGURE 1 is a perspective view taken through a portion of a railway car embodying this invention;

FIGURE 2 is an enlarged side view taken in the direction of the line 2—2 of FIGURE 1;

FIGURE 3 is a cross sectional view taken along the line 3—3 of FIGURE 2;

FIGURES 4 and 5 are side views, in part similar to FIGURE 2, showing the operating mechanism in different positions;

FIGURE 6 is a side elevational view, similar to FIGURE 2, showing another embodiment of the invention;

FIGURE 7 is a cross sectional view taken generally along the line 7—7 of FIGURE 6; and FIGURE 8 is a side view, in part similar to FIGURE 6, showing the operating mechanism in a different position.

Referring now in detail to drawings and in particular to FIGURE 1, a portion of the interior of a freight carrying type railway car is depicted. The car has a cargo area defined by parallel, spaced side walls 11 and 12, a floor 13 and roof 14. A freight bracing bulkhead assembly 15 is supported for movement along the length of the cargo area between spaced cargo bracing positions in a manner that is well known in the art and will not be described in detail. It is to be understood that, although this invention is described in connection with a railway car, the bracing device is susceptible for use in other types of cargo areas and the operating mechanism described may be employed in other applications that will readily suggest themselves to those skilled in the art.

The bulkhead assembly 15 is comprised of a generally open frame made up of vertically extending side members 16 and 17, a center structural member 18 and horizontally extending structural members 19, 21, 22 and 23. The members 16 through 19 and 21 through 23 are fixed together in any known manner to provide an open frame for engaging and bracing freight within the cargo area.

As is well known in this art, upper track assemblies 24 and 25 are fixed to the cargo area adjacent the juncture of the side walls 11 and 12 and roof 14. In a like manner, lower track assemblies 26 and 27 are fixed relative to the floor 13. The track assemblies 24 through 27 are formed with longitudinally spaced apertures 28 that are engaged by locking pins 29, 31, 32 and 33 reciprocally supported at the four corners of the bulkhead assembly 15 for restraining the bulkhead assembly in the preselected freight bracing positions within the cargo area. The locking pins 29, 31, 32 and 33 are supported for reciprocation between an engaged position wherein they engage the apertures 28 and a disengaged position wherein they are spaced from the apertures 28 in a known manner, for example that disclosed in my copending application entitled "Freight Bracing Device," Ser. No. 563,281, filed July 6, 1966, and assigned to the assignee of this invention.

An operating mechanism, indicated generally by the reference numeral 36 (FIGURES 2 through 5) is provided at each side of the bulkhead assembly 15 for selectively moving the locking pins 29, 31, 32 and 33 between their engaged and disengaged positions. Since the operating mechanism 36 at each side of the bulkhead assembly 15 is identical only that at the left hand side of the bulkhead assembly as viewed in FIGURE 1 will be described. Referring now to the remaining figures, the operating mechanism 36 is normally contained within the confines defined by a pair of outwardly extending legs 37 and 38 connected by a web 39 of the bulkhead frame side member 16. The side member 16 may be formed from a structural I-beam, channel or may be otherwise fabricated to give this configuration.

The upper locking pin 29 is pivotally connected in a known manner (not shown) to the upper end of an operating rod 41. In a like manner, the lower locking pin 23 is pivotally connected to the lower end of an operating rod 42. The operating rods 41 and 42 are pivotally connected at their opposite ends to a yoke or bellcrank 43 as by pivot pins 44 and 45, respectively. The bellcrank 43 is affixed to a torsion shaft 46 that is pivotally supported on the side member web 39 by means of a bearing member 47. The torsion shaft 46 extends across the bulkhead assembly 15 and is connected to a similar yoke and operating rods (not shown) at the opposite side for operating the locking pins 31 and 33.

A link 51 is positioned adjacent the outer face of the bellcrank 43 and is pivotally connected to the bellcrank 43 by means of the pivot pin 44 that extends through an aperture 52 (FIGURE 3) formed in the upper end of the link 51. The pivot pin 44 has a headed end 53 that engages the outer face of the link 51 and a cotter key 54 extends through the opposite end of the pivot pin 44 so that the pivot pin 44 is held in place relative to the assembly. The link 51 carries an outwardly extending pivot pin 56 at its lower end. The pivot pin 56 is pivotally journaled in a bore 57 formed in the upper end of an operating link 58. A cotter key 60 axially fixes the links 51 and 58 with respect to each other. The operating link has a larger pivot pin 59 affixed to its lower end, as by a weld 61. The pivot pin 59 and operating link 58 are journaled upon the bulkhead assembly side member 16 by means of a plate 62 that is welded to the side member legs 37 and 38.

The outer end of the pivot pin 59 terminates inwardly of the outer faces of the legs 37 and a pivot pin 63 extends transversely to the pivot axis of the pivot pin 59 and is journaled within it. An operating handle 64 has a pair of upstanding arms that are fixed, as by welding, to the pivot pin 63 so as to journal the operating handle 64 upon the pivot pin 59 for movement about a pivot axis that extends transversely to the pivot axis of the pin 59.

*Operation*

The operating handle 64 is normally positioned within the confines defined by the side member legs 37 and 38 so that it would be concealed within the bulkhead assembly 15. In this position the handle 64 extends vertically and the axis of rotation defined by the pivot pin 56 is substantially coincident with the pivot axis of the bellcrank 43 determined by the center of rotation of the torsion shaft 46. The pivot axis of the pivot pin 59 and accordingly that of the actuating link 58 lies in the same vertical plane with the aforenoted pivot axis and below it. When it is desired to release the locking pins 29, 31, 32 and 33, which are all interconnected by means of the torsion shaft 46, as has been noted, the operating handle 64 is grasped and pivoted outwardly to the dotted line position shown in FIGURE 3 about the pivot pins 63. In this position, the handle 64 may be rotated in either direction about the axis defined by the pivot pin 59. FIGURE 4 shows the movement that occurs upon counterclockwise rotation as viewed in this figure. Upon this rotation, the actuating link 58 is rotated in a counterclockwise direction about the bracket 62 causing the pivot pin 56 to be moved downwardly and to the left. This movement is transmitted through the link 51 and pivot pin 44 to the bellcrank 43. The bellcrank 43 is then rotated in a counterclockwise direction causing the operating rods 41 and 42 to be drawn inwardly, withdrawing the locking pins 29 and 32 at this side of the bulkhead. In a like manner, the locking pins 31 and 32 at the opposite side of the bulkhead will be withdrawn due to their connection to the torsion shaft 46. Rotation of the operating handle 64 in the opposite direction to its normal or at rest position will return the locking pins 29, 31, 32 and 33 to their engaged position. It should be readily apparent that rotation of the operating handle 64 in a clockwise direction from the at rest position about the axis defined by the pivot pin 59 also will cause disengagement of the locking pins 29, 31, 32 and 33.

If the locking pins 29, 31, 32 and 33 are to be actuated by the operating handle at the opposite side of the bulkhead assembly 15, this movement will occur without causing any movement of the operating handle 64 previously described. During this actuation, the torsion shaft 49 may be rotated in either direction, rotation in a clockwise direction being shown in FIGURE 5. This rotation causes the bellcrank 43 to be moved in a clockwise direction and causes withdrawal of the locking pins 29, 31, 32 and 33. In this case, the link 51 pivots about an axis defined by the pivot pin 56 since the actuating link 58 is in a stationary or normal position. The link 51 is free to pivot about pin 56 inasmuch as the pivot axis defined by the pin 56 is coincident with that defined by the torsion shaft 46. Thus, the link 51 rotates with the bellcrank 43 about this axis while the actuating link 58 and operating handle 64 remain stationary.

It should be readily apparent that a relatively simple mechanism is provided whereby movement of the operating handle causes actuation of the locking mechanism and the locking mechanism may be operated without movement of the operating handle. No action is required to cause engagement or disengagement of the operating handle with the locking pin actuating mechanism due to the geometry of the described linkage.

Although it has been assumed that similar operating mechanisms 36 are provided at each side of the bulkhead assembly 15, it is to be understood that only one of the operating mechanisms need embody the invention disclosed herein. In addition, the operating handles need not be positioned at the specific locations described and a greater or lesser number of operating handles, which may or may not embody this invention, may be employed.

In some instances greater movement of the locking pins 29, 31, 32 and 33 is desired than can be accomplished with the mechanism shown in FIGURES 1 through 5. FIGURES 6 through 8 show another embodiment of the invention wherein greater movement of the locking pins may be accomplished through a relatively simple change in the linkage arrangement. The operating rods 41 and 42, link 51, operating link 58 and the handle assembly of this embodiment are substantially the same as the previously described embodiment and, hence, are identified by the same reference numerals in FIGURES 6 through 8. In this embodiment, however, a bellcrank 81 is affixed to the torsion shaft 46, which bellcrank is longer than the bellcrank 43 of the previously described embodiment. The linkage 51 has a pivotal connection, indicated generally by the reference numeral 82, to the bellcrank 81. The operating rods 41 and 42 are pivotally connected to the bellcrank 81, as at 83 and 84. The pivotal connections 83 and 84 are positioned at a greater radius than the location of the pivotal connection 82 so that a given angular movement of the operating link 58 and accordingly torsion shaft 46 will provide a greater linear movement of the operating rods 41 and 42 in the vertical direction.

I claim:
1. A freight bracing bulkhead assembly for retaining freight within a cargo area comprising locking means for retaining said bulkhead assembly in a selected freight bracing position, an operating member supported upon said bulkhead assembly for pivotal movement about a first pivot axis, means operatively connecting said operating member to said locking means for moving said locking means between its engaged and disengaged positions upon pivotal movement of said operating member about said first pivot axis, a first link, a first pivotal connection between said first link and said operating member at a point spaced a fixed distance from said first pivot axis, an actuating member, means supporting said actuating member for movement between first and second positions, a second pivotal connection between said actuating member and said first link, the pivot axis of said second pivotal connection being substantially coincident with said first pivot axis when said actuating member is in its first position for simultaneous pivotal movement of said first link and said operating member about said first pivot axis when said actuating member remains stationary in its first position, and an operating handle operatively connected to said actuating member for displacing said actuating member from its first to its second position and for moving said first link to pivot said operating member about said first pivot axis.

2. A freight bracing bulkhead assembly as set forth in claim 1 wherein the actuating member comprises a second link supported for pivotal movement upon said bulkhead assembly between its first and second positions, the operating handle being connected to said second link at its point of pivotal support upon said bulkhead assembly.

3. A freight bracing bulkhead assembly as set forth in claim 2 wherein the operating handle is pivotally connected to the second link for pivotal movement about an axis transverse to the pivotal axis of said second link from a storage position within the confines of said bulkhead assembly to an operative position outwardly thereof.

4. A freight bracing bulkhead assembly as set forth in claim 1 further including a second operating handle operatively connected to said operating member for pivoting said operating member about said first pivot axis.

5. A freight bracing bulkhead assembly as set forth in claim 1 wherein the locking means comprises locking pins supported at the opposite corners of said bulkhead assembly, each of said operating pins being operatively connected to a torsion shaft supported for rotation upon said bulkhead assembly, said operating member being affixed to said torsion shaft, said torsion shaft thereby defining said first pivot axis.

6. A freight bracing bulkhead assembly as set forth in claim 5 wherein a second operating handle is operatively connected to the torsion shaft for rotating the torsion shaft independently of movement of the first described operating handle.

7. A freight bracing bulkhead assembly as set forth in claim 6 wherein the first operating handle is supported for pivotal movement about an axis transverse to the first pivot axis from a storage position within the confines of said bulkhead assembly to an operative position disposed outwardly thereof.

8. A freight bracing bulkhead assembly as set forth in claim 5 wherein the operating member comprises a bellcrank, the locking pins at at least one side of the bulkhead assembly being connected to said bellcrank by means including a pivotal connection.

9. A freight bracing bulkhead assembly as set forth in claim 8 wherein a single pivot pin provides the first pivotal connection and at least one of the pivotal connections between at least one of the locking pins and the bellcrank.

10. A freight bracing bulkhead assembly as set forth in claim 8 wherein the pivotal connections between the locking pins and the bellcrank are displaced radially outwardly of the first pivotal connection for accelerated linear movement of said pivot pins upon angular rotation of said bellcrank.

11. An operating mechanism for the locking device of a freight bracing bulkhead or the like comprising an operating member supported for pivotal movement about a first pivot axis, means for operatively connecting said operating member to the locking device for moving the locking device between engaged and disengaged positions upon pivotal movement of said operating member about said first pivot axis, a first link, a first pivotal connection between said first link and said operating member at a point spaced a fixed distance from said first pivot axis, an actuating member, means supporting said actuating member for movement between first and second positions, a second pivotal connection between said actuating member and said first link, the pivot axis of said second pivotal connection being substantially coincident with said first pivot axis when said actuating member is in its first position for simultaneous pivotal movement of said first link and said operating member about said first pivot axis when said actuating member remains stationary in its first position, and an operating handle operatively connected to said actuating member for displacing said actuating member from its first to its second position and for moving said first link to pivot said operating member about said first pivot axis.

References Cited

UNITED STATES PATENTS 3,191,546 6/1965 Adler _____ 105—376
3,352,257 11/1967 Lehnert et al. _____ 105—376

DRAYTON E. HOFFMAN, *Primary Examiner.*